United States Patent
Can et al.

(10) Patent No.: US 9,624,135 B2
(45) Date of Patent: *Apr. 18, 2017

(54) POLYCRYSTALLINE ABRASIVE MATERIALS AND METHOD OF MANUFACTURE

(76) Inventors: Antionette Can, Sunward Park (ZA); Anna Emela Mochubele, Benoni (ZA); Geoffrey John Davies, Randburrg (ZA); Johannes Lodewikus Myburgh, Helderkruin (ZA)

( * ) Notice: Subject to any disclaimer, the term of this patent is extended or adjusted under 35 U.S.C. 154(b) by 1497 days.

This patent is subject to a terminal disclaimer.

(21) Appl. No.: 11/547,697

(22) PCT Filed: Sep. 21, 2005

(86) PCT No.: PCT/IB2005/002799
§ 371 (c)(1),
(2), (4) Date: Sep. 7, 2007

(87) PCT Pub. No.: WO2006/032984
PCT Pub. Date: Mar. 30, 2006

(65) Prior Publication Data
US 2008/0115424 A1    May 22, 2008

(30) Foreign Application Priority Data
Sep. 23, 2004 (ZA) ..................... 04/7715

(51) Int. Cl.
C04B 35/626 (2006.01)
C04B 35/624 (2006.01)
(Continued)

(52) U.S. Cl.
CPC ........ *C04B 35/6264* (2013.01); *C04B 35/624* (2013.01); *C04B 35/6265* (2013.01);
(Continued)

(58) Field of Classification Search
None
See application file for complete search history.

(56) References Cited

U.S. PATENT DOCUMENTS 4,339,281 A    7/1982   Chio
4,855,264 A    8/1989   Mathers et al.
(Continued)

FOREIGN PATENT DOCUMENTS

CN   1471567       1/2004
EP   0 061 605 A   10/1982
(Continued)

OTHER PUBLICATIONS

Turova, Nataliya Ya. et al.: "The Chemistry of Metal Alkoxides", Kluwer Academic Publishers, 2002, pp. 107-125.
(Continued)

*Primary Examiner* — Melvin C Mayes
(74) *Attorney, Agent, or Firm* — Haug Partners LLP

(57) ABSTRACT

A method of manufacturing polycrystalline abrasive elements consisting of micron, sub-micron or nano-sized ultrahard abrasives dispersed in micron, sub-micron or nano-sized matrix materials. A plurality of ultrahard abrasive particles having vitreophilic surfaces are coated with a matrix precursor material and then treated to render them suitable for sintering. The matrix precursor material can be converted to an oxide, nitride, carbide, oxynitride, oxycarbide, or carbonitride, or an elemental form thereof. The coated ultrahard abrasive particles are consolidated and sintered at a pressure and temperature at which they are crystallographically or thermodynamically stable.

37 Claims, 4 Drawing Sheets

(51) Int. Cl.
*C04B 35/628* (2006.01)
*C09C 3/06* (2006.01)
*C09K 3/14* (2006.01)

(52) U.S. Cl.
CPC .... *C04B 35/6268* (2013.01); *C04B 35/62635* (2013.01); *C04B 35/62655* (2013.01); *C04B 35/62675* (2013.01); *C04B 35/62807* (2013.01); *C04B 35/62813* (2013.01); *C04B 35/62818* (2013.01); *C04B 35/62821* (2013.01); *C04B 35/62823* (2013.01); *C04B 35/62831* (2013.01); *C04B 35/62836* (2013.01); *C04B 35/62886* (2013.01); *C04B 35/62892* (2013.01); *C04B 35/62897* (2013.01); *C09C 3/063* (2013.01); *C09K 3/1445* (2013.01); *C01P 2002/72* (2013.01); *C01P 2004/03* (2013.01); *C01P 2004/84* (2013.01); *C01P 2006/12* (2013.01); *C04B 2235/3217* (2013.01); *C04B 2235/3225* (2013.01); *C04B 2235/3232* (2013.01); *C04B 2235/3244* (2013.01); *C04B 2235/3258* (2013.01); *C04B 2235/3418* (2013.01); *C04B 2235/386* (2013.01); *C04B 2235/427* (2013.01); *C04B 2235/441* (2013.01); *C04B 2235/46* (2013.01); *C04B 2235/465* (2013.01); *C04B 2235/5409* (2013.01); *C04B 2235/5427* (2013.01); *C04B 2235/5436* (2013.01); *C04B 2235/5445* (2013.01); *C04B 2235/5472* (2013.01); *Y10S 977/773* (2013.01)

(56) References Cited

U.S. PATENT DOCUMENTS

| | | | |
|---|---|---|---|
| 4,957,886 A | | 9/1990 | Mathers et al. |
| 5,104,422 A | | 4/1992 | St. Pierre |
| 5,106,392 A | * | 4/1992 | Slutz et al. ............ 51/295 |
| 5,185,012 A | | 2/1993 | Kelly |
| 5,238,669 A | * | 8/1993 | Sullivan ............ 423/344 |
| 5,344,526 A | | 9/1994 | Nishibayashi et al. |
| 5,352,254 A | | 10/1994 | Celikkaya |
| 5,474,583 A | | 12/1995 | Celikkaya |
| 5,711,783 A | | 1/1998 | Schloh |
| 5,876,682 A | * | 3/1999 | Kurihara et al. ............ 423/344 |
| 6,414,338 B1 | * | 7/2002 | Anderson ............ 257/77 |
| 6,475,254 B1 | | 11/2002 | Saak et al. |
| 2002/0194955 A1 | | 12/2002 | Fang et al. |
| 2003/0093956 A1 | | 5/2003 | Saak et al. |
| 2004/0136891 A1 | * | 7/2004 | Kijima et al. ............ 423/263 |
| 2004/0258611 A1 | * | 12/2004 | Barrow et al. ............ 423/625 |
| 2006/0042417 A1 | * | 3/2006 | Gash et al. ............ 75/415 |

FOREIGN PATENT DOCUMENTS

| | | |
|---|---|---|
| EP | 0 402 677 A | 12/1990 |
| EP | 0 503 974 A | 9/1992 |
| EP | 0503974 A | 9/1992 |
| EP | 0 715 930 A | 6/1996 |
| GB | 1213999 | 11/1970 |
| GB | 1318467 | 5/1973 |
| JP | 62-263991 | 11/1987 |
| JP | 03-024185 A | 2/1991 |
| JP | 03-003776 | 9/1991 |
| JP | 4-202490 | 7/1992 |
| JP | 04-202490 A | 7/1992 |
| JP | 05-105560 A | 4/1993 |
| JP | 7-509511 | 7/1995 |
| JP | 09-125110 A | 5/1997 |
| JP | 11-180797 | 6/1999 |
| JP | 2000-501135 A | 2/2000 |
| JP | 2003-055649 | 2/2003 |
| JP | 2003-055649 A | 2/2003 |
| JP | 2004-502034 | 1/2004 |
| KR | 950011676 B | 10/1995 |
| RU | 961281 A | 6/1993 |
| RU | 2 126 735 C | 2/1999 |
| RU | 2146187 C | 3/2000 |
| RU | 2163222 C | 2/2001 |
| WO | WO 94/02560 | 2/1994 |
| WO | WO 97/20011 A | 6/1997 |
| WO | WO 03/076337 A | 9/2003 |

OTHER PUBLICATIONS

Written Opinion for PCT/IB2005/002795.
Office Action mailed Dec. 28, 2010 for related U.S. Appl. No. 11/578,861.
Office Action mailed Aug. 3, 2010 for related U.S. Appl. No. 11/578,861.

* cited by examiner

POLYCRYSTALLINE ABRASIVE MATERIALS AND METHOD OF MANUFACTURE

This application is a 371 of PCT/IB2005/002799 filed on Sep. 21, 2005, published on Mar. 30, 2006 under publication number WO 2006/032984 A2 and claims priority benefits of South African Patent Application No. ZA 2004/7715 filed Sep. 23, 2004.

BACKGROUND OF THE INVENTION

This invention relates to polycrystalline abrasive bodies and materials, and to a method of making them.

Abrasive compacts are used extensively in cutting, milling, grinding, drilling and other abrasive operations. They generally contain ultrahard abrasive particles dispersed in a second phase matrix. The matrix may be metallic or ceramic or a cermet. The ultrahard abrasive particles may be diamond, cubic boron nitride (cBN), silicon carbide or silicon nitride and the like. These particles may be bonded to each other during the high pressure and high temperature compact manufacturing process generally used, forming a polycrystalline mass, or may be bonded via the matrix of second phase material(s) to form a polycrystalline mass. Such bodies are generally known as polycrystalline diamond or polycrystalline cubic boron nitride, where they contain diamond or cBN as the ultrahard abrasive, respectively.

Examples of diamond and cubic boron nitride abrasive compacts are described in U.S. Pat. Nos. 3,745,623; 3,767,371; 3,743,489; 4,334,928; 5,466,642 and 5,328,875.

For example, U.S. Pat. No. 4,334,928 teaches a sintered compact for use in a tool consisting essentially of 80 to 20 volume percent of high pressure form boron nitride; and the balance being a matrix of at least one binder compound material selected from the group consisting of a carbide, a nitride, a carbonitride, a boride and a silicide of a IVa or a Va transition metal of the periodic table, mixtures thereof and their solid solution compounds. The matrix forms a continuous bonding structure in a sintered body with the high pressure boron nitride interspersed within a continuous matrix. The methods outlined in this patent all involve combining the desired materials using mechanical milling/mixing techniques such as ball milling, mortars and the like.

In U.S. Pat. No. 5,466,642 it is taught that a wear resistant cBN-based cutting tool, superior in toughness, includes a specified amount of at least one of a Ti carbide/nitride component, a compound including at least one of Ti and Al, tungsten carbide, $Al_2O_3$, and the balance being cBN and incidental impurities. The method of manufacture as described involves wet blending in a ball mill. The incidental impurities mainly result from material abraded from the mill balls and body.

In U.S. Pat. No. 5,328,875 a PCBN ceramic comprising a composition having a bonding phase constituent component, a dispersed phase constituent component, and unavoidable impurities to provide a high strength ceramic for cutting tools of high toughness and high resistance to wear and chipping is claimed. The bonding phase constituent component has one or more of titanium and aluminum carbide, nitride and carbonitride compounds including oxygen, and 20% to 48% by volume of decomposed reaction phase cubic crystal boron nitride. The dispersed phase constituent component comprises cubic crystal boron nitride, and the decomposed reaction phase comprises one or more of titanium carbide, titanium nitride and titanium carbonitride, and one or more of aluminum oxide and aluminum nitride, as well as titanium boride. The crystal grain sizes in the bonding phase comprising the decomposed reaction phase, and the crystal grain sizes in the dispersed phase comprising the cubic boron nitride are all said to be less than 1 micron. The titanium and aluminum carbide compound is preferably $Ti_2$-3AlC, the titanium and aluminum nitride compound is substantially $Ti_2$-3AlN, and the titanium and aluminum carbonitride compound is substantially $Ti_2$-3AlCN. The decomposed reaction phase substantially comprises one or more of TiC, TiN, TiCN, $Al_2O_3$, AlN and $TiB_2$. The described method of manufacture involves milling and mixing the desired component particulate materials in a wet ball mill.

Some significant problems arise with the methods of the prior art. The general methods involving mechanical milling and mixing procedures in order to combine the desired starting materials lead to unavoidable comminution and crushing of said components. This in turn causes a wide spread of particle sizes of the often complex and manifold components to be generated with a resultant lack of homogeneity of the components. This inhomogeneity leads to an inability to accurately determine and control the phase structure of the final material after sintering and in turn the true potential of the material as a cutting tool or the like cannot be exploited. Such materials can also exhibit poor characteristics in applications, which result from an inadequate dispersion and homogeneity of the constituents.

Moreover these procedures are inappropriate as the particle sizes of the desired starting constituents become finer, in particular for submicron particulate materials and more particularly for nano-sized component materials, due to significant difficulties in dispersion. Use of these procedures thus imposes limitations on making composite materials with homogeneous submicron and nano-sized phases.

Further it is impossible to mill ultrahard abrasive particulates without to a greater or lesser extent abrading the mill balls, rods and mill body materials. The material so generated by this abrasion necessarily contaminates the mix of desired components with either undesirable material or, if that material could be considered as desirable, then it will be introduced in an uncontrollable and variable way. This contamination is particularly prevalent when high energy milling techniques are employed in an attempt to use submicron and nano-sized starting constituent materials. During the life of milling bodies, balls and rods the inescapable abrasion leads to progressive changes in dimensions and surface texture of these items which leads to a progressive change in their milling, mixing and comminution behaviour. These changes lead to further variability in the dispersion, homogeneity, and degree of contamination of the materials being combined and so, in turn, variability in the structure, properties and behavior in application of the finally produced composite materials and tools. Moreover submicron and nano-grain sized materials are particularly prone to these problems and difficult to make with such methods.

Milling and mixing procedures also tend to damage and break up fibers, whiskers and in general high aspect ratio particulate materials which might be added to modify the mechanical properties of the desired composite, usually for toughness enhancement and thus defeat the object thereby.

There are examples in the prior art where milling and mixing techniques are not predominantly employed. For example, it is taught in U.S. Pat. No. 5,211,726 that granules of cBN or diamond, of a range of sizes from fine, about 0.1 micron, to coarse, about 1 mm, may be coated in one or more layers of active coating and these coated entities sintered at a pressure and temperature to yield multigrain abrasive compacts. The methods of coating are restricted to chemical vapor deposition (CVD) techniques, for coating multi-grained granules of a specific type of cBN material from about 50 micron to about 1 mm in size.

EP 0 577 375 also teaches a method for producing abrasive compacts utilizing diamond or cBN as ultrahard components, whereby coatings of refractory oxides, nitrides and carbides are deposited onto the diamond or cBN and the coatings sintered at temperatures and pressures where the diamond and cBN are expected to be thermodynamically stable. The method of coating disclosed is chemical vapour deposition involving diamond or cBN particles to be coated in the sizes 20 to 40 microns.

U.S. Pat. No. 5,536,485 discloses a method whereby a diamond or cBN sinter can be produced by first coating the diamond or cBN particles in gaseous or vapour environments followed by sintering said coated particles at temperature and pressure conditions where diamond and cBN may be both thermodynamically stable and thermodynamically metastable.

Much of the prior art concerning materials where cBN is the ultrahard component depend upon reactions with metals such as aluminium, titanium or silicon, which are capable when molten of wetting the cBN, significantly reacting with the cBN and causing it's partial decomposition. These approaches therefore lead to materials that have the resultant decomposition phases incorporated into the complex microstructure of the resultant material. Necessarily complex borides, nitrides and boronitrides of the reacting metals will be present, often in inhomogeneous distributions with the other phases introduced. This tends to limit the materials that can be produced to those possible by the respective reactions and to excessively complex structures.

SUMMARY OF THE INVENTION

According to one aspect of the invention a method of manufacturing a polycrystalline abrasive element includes the steps of providing a plurality of ultrahard abrasive particles having vitreophilic surfaces, coating the ultrahard abrasive particles with a matrix precursor material, treating the coated ultrahard abrasive particles to render them suitable for sintering, preferably to convert the matrix precursor material to an oxide, nitride, carbide, oxynitride, oxycarbide, or carbonitride of the matrix precursor material, or an elemental form of the matrix precursor material, or combinations thereof, and consolidating and sintering the coated ultrahard abrasive particles at a pressure and temperature at which they are crystallographically or thermodynamically stable.

The matrix precursor material is preferably an amorphous or a nano-crystalline oxide, hydroxide or oxo-hydroxide. The ultrahard abrasive particles are preferably selected from the group comprising diamond, cubic boron nitride, silicon carbide, silicon nitride, boron carbide, boron suboxide ($B_6O$) and the like.

In particular, the ultrahard abrasive particles are diamond or cubic boron nitride or a combination of these materials, in which case the particles have to undergo a surface treatment process in order to render the surfaces thereof vitreophilic. This forms a further aspect of the present invention, in terms of which the surface chemical species are chosen and generated by appropriate treatments in order that the surface chemical species so formed may be compatible with and take part in subsequent wet chemical reactions and means of coating the ultrahard particles. Surface chemistries of this nature may be described as being vitreophilic or glass loving, in that they can form bonds with oxide components typical in glass or glasslike amorphous materials. In this way the coat materials are then likely to be chemically bonded to the surface of the ultrahard particles.

The converted matrix precursor materials are typically selected from micron, sub-micron or nano-grain sized oxides, nitrides, carbides, oxynitrides, oxycarbides, carbonitrides or elemental matrix materials, or combinations thereof. They typically include the oxides, nitrides, carbides, oxynitrides, oxycarbides and carbonitrides of aluminium, titanium, silicon, vanadium, zirconium, niobium, hafnium, tantalum, chromium, molybdenum and tungsten and any appropriate combination of these materials. Preferably these matrix precursor materials will be nano-grain sized. The preferred elemental matrices are tungsten, molybdenum or combinations or alloys of these metals, in particular of nano-grain sizes.

The precursors for the matrix materials are preferably coated onto the ultrahard abrasive particles using a so-called sol-gel technique. The ultrahard particles are suspended in liquid media where suitable chemical reagents, in particular one or more alkoxides, are introduced so that colloidal entities may form and bond to the surfaces and build up into coatings on the said particles. The coats so formed are mainly micro-porous oxides, hydroxides or oxo-hydroxides of the metals or metalloids referred to above.

Temperature controlled heating in air, vacuum or inert gas is preferably carried out to remove volatiles and unwanted chemical species attached to the high surface area of the micro-porous amorphous coats, such as hydroxyl species, in particular —OH.

Further heat treatment or calcinations can be employed to crystallize the coats to form fine grained or nano-size grained oxide ceramics.

As some oxide ceramics undergo phase changes in certain temperature ranges, choice of the particular crystalline phases by the temperature and times employed is a further aspect of the invention.

Certain of the oxide coat materials do not crystallize over large ranges of temperature and can thus form glasses and can densify by vitreous sintering mechanisms.

Temperature controlled reactions in reactive gases may also be employed to convert the amorphous oxides or crystalline oxide ceramics into crystalline non-oxide ceramics. In particular nitrides are formed by reacting the coats with ammonia gas. Carbides may be formed by reacting the coats in mixtures of carbonaceous gases and hydrogen, for example mixtures of methane or ethane and hydrogen. Where some oxide coats are reducible by hydrogen, they may converted into micro or nano-grain sized elements or metals.

A particular aspect of the invention is that due to the amorphous or micro-crystalline nature of the oxide precursor coats, the temperatures required to convert them into chosen ceramics or metals by reaction with gases is significantly lower than the temperatures required for conventional oxide ceramics produced by conventional calcining and melting.

The coated ultrahard particles are preferably consolidated, compacted and the coats sintered by hot pressing, particularly under conditions of high pressure and temperature, such as by hot pressing to appropriate temperatures at chosen pressures for chosen times. The conditions chosen will depend upon the particular ultrahard particles and the particular coat material to be sintered. Preferred hot pressing equipment includes high pressure devices such as belt high pressure devices and the like well known in the art.

The coating of the ultrahard abrasive particles forms another aspect of the invention, as does the treatment of the coated particles.

Consolidation and sintering of the coated and treated particles at high pressure and temperature forms yet another aspect of the invention.

The polycrystalline abrasive elements or compacts of the invention are preferably composite materials comprising a mass of ultrahard particulate materials of any size or size distribution smaller than about several hundred microns, down to and including sub-micron and also nano-sizes (particles less than 0.1 microns i.e. 100 nm), which are well dispersed in a continuous matrix made of extremely fine grained oxide ceramics, non-oxide ceramics, cermets or combinations of these classes of materials.

The method of the invention has also opened the way for a host of unique polycrystalline ultrahard abrasive elements or composites. These include polycrystalline ultrahard abrasive elements comprising diamond in a matrix selected from titania, $TiO_2$, hafnia, $HfO_2$, silica, $SiO_2$, zirconia, $ZrO_2$, titanium nitride, TiN, vanadium nitride, VN, hafnium nitride, HfN, niobium nitrides, NbN, $Nb_2N$, tantalum nitride, TaN, molybdenum nitride, $Mo_2N$, tungsten nitride, $W_2N$, titanium carbide, TiC, vanadium carbide, VC, hafnium carbide, HfC, niobium carbide, NbC, tantalum carbide, TaC, molybdenum carbide, $Mo_2C$, tungsten carbides, $W_2C$, WC, molybdenum, Mo and Tungsten, W; polycrystalline ultrahard abrasive elements comprising cubic boron nitride in a matrix selected from alumina, $Al_2O_3$, titania, $TiO_2$, hafnia, $HfO_2$, silica, $SiO_2$, zirconia, $ZrO_2$, vanadium nitride, VN, hafnium nitride, HfN, niobium nitrides, NbN, $Nb_2N$, tantalum nitride, TaN, molybdenum nitride, $Mo_2N$, tungsten nitride, $W_2N$, vanadium carbide, VC, hafnium carbide HfC, niobium carbide, NbC, tantalum carbide, TaC, molybdenum carbide, $Mo_2C$, tungsten carbides, $W_2C$, WC, molybdenum, Mo and Tungsten, W; and polycrystalline ultrahard abrasive elements comprising combinations of diamond and cubic boron nitride in a matrix selected from alumina, $Al_2O_3$, titania, $TiO_2$, hafnia, $HfO_2$, silica, $SiO_2$, zirconia, $ZrO_2$, titanium nitride, TiN, vanadium nitride, VN, hafnium nitride, HfN, niobium nitrides, NbN, $Nb_2N$, tantalum nitride, TaN, molybdenum nitride, $Mo_2N$, tungsten nitride, $W_2N$, titanium carbide, TiC, vanadium carbide, VC, hafnium carbide HfC, niobium carbide, NbC, tantalum carbide, TaC, molybdenum carbide, $Mo_2C$, tungsten carbides, $W_2C$, WC, molybdenum, Mo and Tungsten, W. Other unique elements or composite materials made possible by the invention include diamond in an alumina matrix, cubic boron nitride in a titanium nitride matrix or cubic boron nitride in a titanium carbide matrix, provided that the grain size of the matrix material is nano-sized.

BRIEF DESCRIPTION OF THE DRAWINGS

The invention will now be described in more detail, by way of example only, with reference to the accompanying figures in which.

DETAILED DESCRIPTION OF PREFERRED EMBODIMENTS

Figure 1:
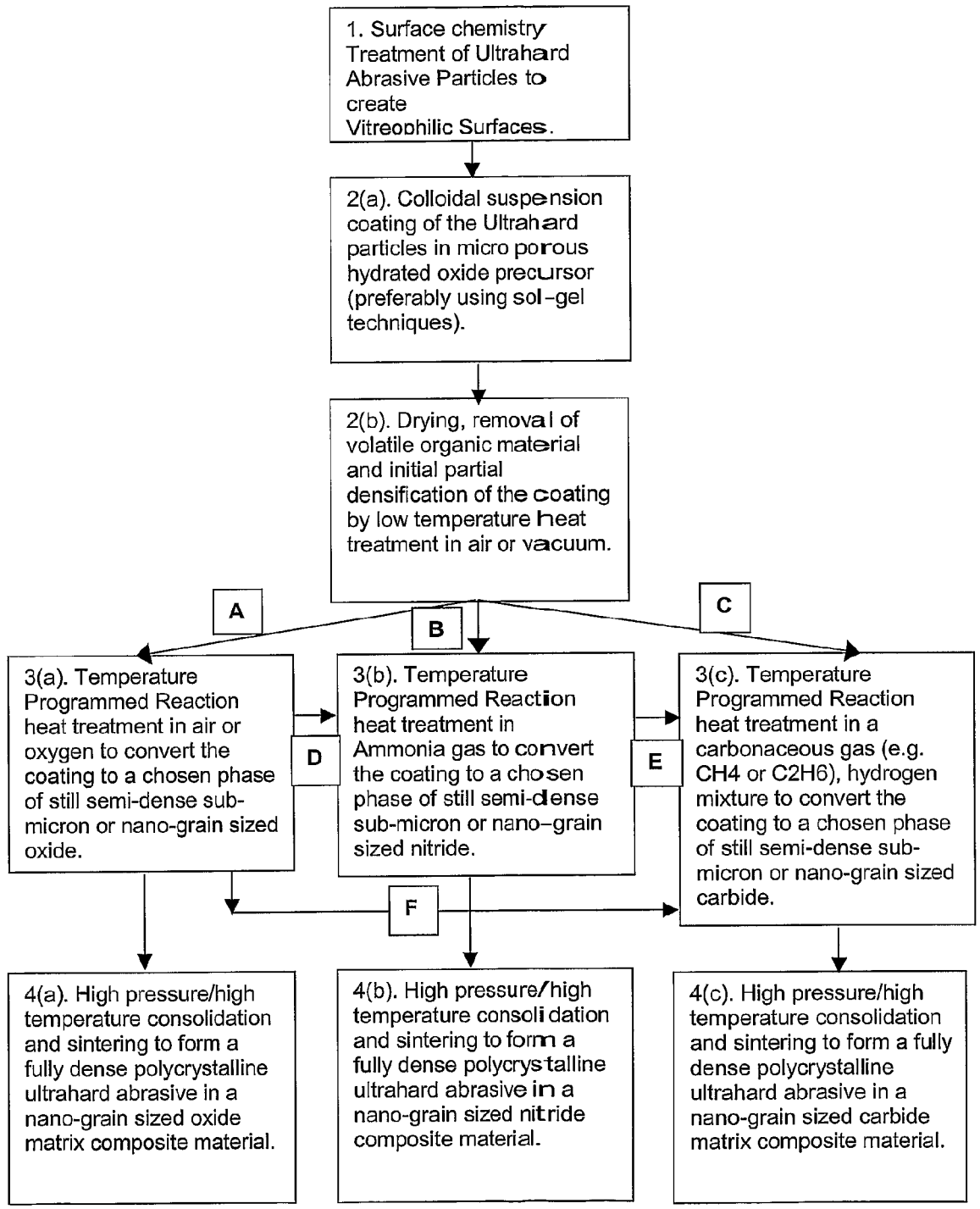
FIG. 1 is a schematic diagram of the process steps of the invention.

The invention relates to polycrystalline abrasive bodies and materials, also referred to as polycrystalline abrasive elements, for use as cutting tools for turning, milling and honing, drilling cutters for rock, ceramics and metals, wear parts and the like, and a method of making the same. The invention is particularly directed to improved homogeneous composite materials where the material phases present are micron, sub-micron and/or nano-grain sized, so that the expected improvements in properties and behaviour in applications as a result of the use of such material phases can be exploited.

These materials exhibit improved properties, which result in enhanced behaviour in a range of applications where the composite abrasive bodies of the invention can be used. Many of the problems experienced in the prior art to do with lack of homogeneity in the microstructures, complexity of the compositional phases and impurities introduced are addressed by the invention.

The composite abrasive bodies are made up of micron, sub-micron, or nano-sized ultrahard abrasive particles dispersed in micron, sub-micron or nano-grain sized matrix materials. For the purposes of this invention sub-micron particles or grains are defined as having their major diametric dimension between 1 micrometer (1000 nm) and 0.1 microns (100 nm), and nano-sized particles or grains as having their major diametric dimension smaller than 0.1 micron (100 nm).

The ultrahard abrasive particles include diamond, cubic boron nitride, silicon carbide, silicon nitride, boron carbide, boron suboxide ($B_6O$) and the like, and any combination of these particle types. Preferably the ultrahard particles are diamond or cubic boron nitride or a combination of these materials.

The matrix materials include but are not restricted to micron, sub-micron or nano-grain sized oxide, nitride, carbide, oxynitride, oxycarbide or carbonitride matrices. The sub-micron or nano-sized matrix materials include the oxides, nitrides, carbides, oxynitrides, oxycarbides and carbonitrides of aluminium, titanium, silicon, vanadium, zirconium, niobium, hafnium, tantalum, chromium, molybdenum and tungsten and any appropriate combination of these materials. Preferably these matrices will be nano-grain sized compounds of aluminium, titanium, tantalum, silicon or zirconium.

The composite abrasive bodies of the invention encompass compositional ratios of dispersed ultrahard particles to matrix material of from about 25% to in excess of 98% by volume, although they are not restricted to these compositional ratios.

A key aspect of the method of the invention is that precursors for the desired matrix materials may be accurately coated on each individual ultrahard particle using colloidal technology, so that each particle has substantially an identical dimensional and structural coat to all others. This enables a great degree of structural homogeneity to be obtained which is significantly better than that obtainable with the methods of the prior art. This is possible for fine ultrahard particles of micron, sub-micron and even nano-sized dimensions because a distinct character of the method of the invention is that the precursor coating materials and subsequent final matrix materials brought about by chosen heat treatment procedures can be of a very fine nano-grain size. In turn this allows very high ultrahard particle contents above 90% by volume to be achieved, with good homogeneity.

The method of the invention encompasses generally four procedural components, viz, 1) providing ultrahard abrasive particles with vitreophilic surfaces or, where appropriate, chemically treating the ultrahard abrasive particle surfaces to render them vitreophilic; 2) employing colloidal suspension reaction methods to coat the ultrahard particles with a precursor material; 3) heat treating the so coated ultrahard particles in gaseous environments including those incorporating reaction gases to convert the coat to chosen oxides, nitrides, carbides, oxynitrides, oxycarbides and/or carbonitrides; and 4) high pressure, high temperature consolidation and sintering to generate fully dense fine structured and nano-structured composite material pieces.

In the first step, the surface chemistry of the ultrahard particulate material is manipulated to provide the particles with a vitreophilic nature. Vitreophilic, "glass loving", is defined as being of such a character that chemical bonds with oxide materials can readily be formed. Treatments that are capable of creating chemical species on the surface required for vitreophilic behaviour of the ultrahard particles include, but are not restricted to, boiling in oxidative acids such as concentrated nitric acid, where appropriate, or exposure to strong oxidizing agents such as hydrogen peroxide solutions or heating in air or oxygen. The surfaces so generated allow the formation and growth of oxide and hydroxide based coatings onto the particulate material and good adherence with the so formed oxide based precursor coatings.

In the second step, colloidal suspension coating of the ultrahard abrasive particles with amorphous and/or nano-grain sized, hydrated oxide precursor materials is employed. It has been found that adaptations of certain colloidal techniques are capable of accurately coating micron, sub-micron and even nano-sized ultrahard material particles. There are two general colloidal routes whereby appropriate coatings can be generated, one depending upon whether aqueous solutions of inorganic salts are used and the other where metal organic compounds are used. A preferred approach for this is the latter sol-gel approach, more preferably sol-gel approaches using the hydrolysis and polycondensation of alkoxides or alcoholates. The precursor coatings generated by this method are micro-porous, amorphous or nano-grain sized hydrated oxides of high surface area. Sol-gel techniques, in particular, are highly versatile and amenable to the control of the heterogeneous nucleation and growth of extremely accurate coats of hydrated oxide precursor materials onto the surfaces of vitreophilic suspended particles, which may be as small as 10 nm in dimensions or even smaller.

The favoured sol-gel approach is to slowly add an alcoholic solution of a metal alkoxide or combination of metal alkoxides to a suspension of ultrahard material particles in a low concentration aliquot of pure water in the same alcohol. The metal alkoxides are hydrolyzed by the water to form metal hydroxide monomers, which in turn undergo polycondensation reactions that progressively form hydrated, oxide micro porous materials, referred to in this invention as the oxide precursor materials or coats. By appropriate choice of alcohol type, typically having the same alkyl groups as the alkoxide(s), concentration of suspended ultrahard particles, concentration of alkoxide solution in the alcohol, the alkoxide water ratio, temperature and the presence or absence of other agents such as acids or bases it is possible to control the formation of a coating of the oxide precursor on the suspended ultrahard particles. Each type of alkoxide used requires specific conditions to be employed to coat the suspended ultrahard particulate material in the desired coat.

An important aspect of this approach is that the byproducts of the alkoxide hydrolysis and polycondensation reactions are water, alcohols and hydroxide species on some of the free surfaces of the coating. All of these byproducts are readily removable by drying and low temperature heat treatment. Moreover the alkoxides themselves are readily available as high purity grades. The alkoxide sol-gel approach thus leads to very pure uncontaminated oxides. The final matrix materials can thus be made very pure relative to those generated by the prior art methods. Certainly the ubiquitous impurities introduced by milling/mixing methods are absent in the method of this invention.

Yet another very important aspect of the method of the invention is that a large scope of mixed precursor oxide materials may be made by simultaneously employing more than one type of alkoxide based upon different metals. In this way the oxide precursor material so generated will be a mixed oxide with the different metals distributed on a molecular scale. Alternatively it is known that alkoxide complexes involving more than one metal can be made. These alkoxide complexes can be used in the method of the invention. Consequently the oxides, nitrides and carbides generated by the full use of the method of the invention can include mixed and alloyed phases. Further it is known that mixed metal alkoxide structures can be made. Use of such mixed metal alkoxides also leads to mixed metal precursor oxides and subsequently mixed metal composite matrix phases.

The use of mixtures of alkoxides or mixed alkoxides also allows the doping of the precursor and subsequent matrix materials with sintering and structure modification agents such a yttria, magnesia, and the like. A great deal of the established ceramic, cermet and metallurgical material science knowledge can thus be brought to bear in the making of the composite materials via the method of the invention.

After removal from suspension and washing the coated particles are slowly dried by, for example, heating in a vacuum below 100° C. The micro-porous, amorphous or nano-grain sized structure of the precursor coat materials renders them ideal for temperature programmed reaction heat treatments in gaseous reactants or environments in order to form desired fine grained and nano-grain sized ceramic and other materials as components of the composite materials.

In the third step, temperature programmed reaction heat treatments of the precursor coated ultrahard particles in chosen gaseous environments is employed to partially densify the coat and to convert it to a chosen fine or nano-grain sized ceramic material. Heat treatment in air or oxygen is employed to calcine, partially densify the coat, drive off any remaining water and alcoholic component and crystallize the coat as a desired oxide phase. Choice of heating rate, top temperature and duration of top temperature is specific to the structure, phase and type of oxide required.

If it is desired to convert the coat into a nitride the dried or air calcined coated material may be heated in dry ammonia at temperatures typically up to 1100° C., although temperatures up to and including those of about 1400° C. may be necessary in certain applications. It has been found that this temperature programmed reaction treatment progressively reduces the coat material and is capable of converting the oxide base coats to stoichiometric and non-stoichiometric nitrides and oxynitrides. Again choice of heating rate, gas flow rates, top temperature and duration of top temperature is specific to the structure, phase and type of nitride required.

It has also been found that oxynitride phases can be generated by appropriate choice of the conditions.

If it is desired to convert the coat into a carbide, the dried or air calcined coated material may be heated in a mixture of carbonaceous gas such as methane or ethane and hydrogen at temperatures typically below 1200° C., although temperatures up to and including 1500° C. may be necessary in certain applications. Again choice of heating rate, gas flow rate, top temperature and duration of top temperature is specific to the structure, phase and type of carbide required. It has also been found that oxycarbide phases can be generated by appropriate choice of the conditions. Alternatively, it has been found that the nitride coats generated as described above can be converted to carbides by appropriate heat treatment in methane or ethane hydrogen mixtures. Carbonitride phases can be generated by choice of conditions.

Some of the oxide coats may readily be reduced to the corresponding elemental metal by reduction in pure hydrogen. Examples of such coats are tungstic and molybdic oxides, $WO_3$ and $MoO_3$, which may readily be reduced to the metals at low temperatures in the typical range of 500 to 700° C.

A key aspect of the temperature programmed reaction component of the method of the invention is that it was observed that the grain sizes of the resulting oxide, nitride, carbide coatings on the ultrahard particles were typically all nanometers in dimensions. Moreover another valuable aspect of these heat treatments was that the required temperatures and times to effect the conversions were low and short, respectively, when compared to the temperatures and times required for analogous conversions of conventional oxide materials made by melt or fusion techniques. In some cases of nitride formation temperatures as much as 400° C. lower were required for the method of the invention as compared to the nitriding of conventional oxide materials. Further the coated ultrahard particles can be separate and unagglomerated. This aids in the homogeneity of structures obtained during the subsequent high pressure, high temperature consolidation, sintering stage to follow.

In the fourth step, high temperature consolidation and sintering are employed at temperatures and pressures where the ultrahard particle materials are thermodynamically and chemically stable to create fully dense or near fully dense micron, sub-micron and nano-sized composite monolithic material pieces. For the preferred ultrahard materials of diamond and cBN these conditions were in the ranges of 2.5 GPa to 8 GPa and 600° C. to 1800° C. The dense composite materials so generated can also be bonded to metal carbide substrates in situ during the consolidation and sintering. The high pressure high temperature apparatus used can be any of those known in the art capable of generating appropriate conditions.

The above process steps will now be discussed in more detail with reference to FIG. 1.

1. Surface Treatment of the Ultrahard Particles to render them Vitreophilic.

In the case of micron, sub-micron or nano-grain sized diamond the surface functional groups that terminate the surface may be caused to be mainly made up of C—OH, C—O—C, C=O and O=C—O[31] by methods such as heating in concentrated oxidative acids, such as mixtures of nitric and/or sulphuric acid. Alternatively, gaseous heat treatment in 20% hydrogen/argon at 900° C. to terminate the surface in H, followed by 20% oxygen/argon at 480° C. creates a surface dominated by the oxygen species. Other methods of producing oxygen based functional groups attached to the diamond surface may also be employed. The oxidized diamond surface renders it vitreophilic, that is, capable of forming chemical bonds with oxides including, in particular, hydrated oxide structures.

It is expected that in the case of submicron cBN a heat treatment in air above 600° C. would increase the concentration of boron oxygen and nitrogen oxygen species on the surface and this may be indicated by Fourier Transform Infra Red Reflectance Spectroscopy. Such a surface exhibited vitreophilic behaviour on subsequent colloidal coating with sol-gel derived oxides. Many of the other well known ultrahard materials such as silicon carbide and silicon nitride and the like have oxidative chemical termination of their surfaces which renders them normally vitreophilic and suitable for the method of this invention.

2. Colloidal Coating of the Ultrahard Material Particles.

Referring to part 2(a) of the schematic diagram, general sol-gel techniques to produce precursor hydrated oxide materials to the desired matrix materials are used. One example of such an approach includes the hydrolysis of aluminium sulphate solutions at elevated temperatures such as 100° C., in the presence of organic compounds such as urea, to coat particles in suspension. Hydrous aluminium oxide coats may be produced in this way.

A preferred more general approach, however, is to use the hydrolysis and polycondensation reactions of metal alkoxides in alcohol solutions. Metal alkoxides or alcoholates have a general formula represented by $Mn^+[OR]_n$, where M is a metal of valence n, O is oxygen and R is an alkyl group. The metal is bonded to the alkyl groups via the oxygen atoms. Most metal alkoxides are soluble in alcohols and can readily be hydrolysed with water in solution in the alcohol to form hydroxides:

$$M[OR]_n + nH_2O \longrightarrow M[OH]_n + nROH \quad (1)$$

Polycondensation reactions as in equation (2) below can then proceed and M—O—M bonds are formed.

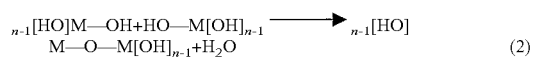

$$_{n-1}[HO]M\text{—}OH + HO\text{—}M[OH]_{n-1} \longrightarrow {}_{n-1}[HO]$$
$$M\text{—}O\text{—}M[OH]_{n-1} + H_2O \quad (2)$$

Progressive continuation of this reaction results in a three dimensional —M—O—M—O—M— network. The oxide precursor material so formed is usually amorphous or nano-grain sized with very high surface area and is micro-porous with $H_2O$ and alcohol in the pores. The surfaces of the pore structure are terminated in hydroxyl, OH functional groups. By appropriate choice of concentrations, alkoxide/water ratios, temperature, solvent alcohol and the presence of other chemical agents such as acids or bases the porous oxide precursor material can be caused to nucleate and grow as a coat on vitreophilic suspended particles in the alcohol solvent. An appropriate concentration of suspended particles to act as growing centers for the coat material must be chosen.

A solution of metal alkoxide(s) is made up in anhydrous alcohol and then slowly added over a time period of about a few hours, to a continuously stirred suspension of the ultrahard particles in an aliquot of pure water in usually the same alcohol. A peptizing agent such as an acid or base may be added to stabilize the suspension.

Alternatively where a particularly reactive alkoxide reagent is to be employed, better control over the coating formation can be created by slowly adding an aliquot of water in alcohol to a suspension of the ultrahard particles in a suspension of the alkoxide in anhydrous alcohol.

The water and alcohol byproducts of the reactions may be removed by drying and low temperature heat treatment 2(b). Similarly the OH surface functional groups can be removed. Typically after filtering or centrifuging the suspensions followed by washing in new clean alcohol and then de-ionized water, the coated particles can slowly be dried at about 60° C. under a low vacuum for about two days. Further removal of residual water and alcohol can then by achieved by heating to about 300° C. in air.

Many elements of the periodic table are capable of forming alkoxides. The alkoxides found to be useful for creating oxide matrices using the method of this invention include those of titanium, aluminium, zirconium, chromium, silicon with the alkoxides of calcium, magnesium, hafnium, yttrium sometimes used as additives including combinations of these alkoxides. The alkoxides found to be useful for creating nitride matrices using the method of this invention include those of aluminium, titanium, zirconium, silicon, tantalum, chromium, niobium, hafnium, vanadium, molybdenum and tungsten, and combinations of these. The alkoxides found to be useful for creating carbide matrices using the method of this invention include those of titanium, zirconium, silicon, tantalum, chromium, niobium, hafnium, vanadium, molybdenum and tungsten and combinations of these.

The alkyl groups R in the generalized formula for metal alkoxides, $M[OR]_n$, may include methyl, ethyl, n-propyl, n-butyl and any of the general formula $-C_xH_{2x+1}$. In addition the alkyl groups where side chain alkyl groups are present, such as in the iso-propyl group, $-CH(CH_3)_2$, or sec-butyl group, $-CHCH_2CH_3CH_3$, are included.

The rate of the hydrolysis reaction and the time to the gelling point for each metal alkoxide are greatly dependent upon the chain length of the alkyl groups. The smaller the chain length of R, the faster the hydrolysis and also the shorter the time to the gelling of the oxide precursor material in the coating of the ultrahard particles. The coating characteristics for each type of desired hydrated oxide precursor coat may be strongly influenced by the choice of R.

The alcohols used as the solvent for the alkoxide and water, and as the suspension fluid for the ultrahard particles, may be chosen from any of the normally commercially available liquid solvents. The preferred alcohols are ethanol, methanol and iso-propyl alcohol.

Table 1 provides an exemplary, but not a complete, list of some of the most useful alkoxides in the method of the invention.

TABLE 1

| Metal (M) | Alkoxide name | Formula $M[OR]_n$ |
|---|---|---|
| Titanium | Titanium methoxide | $Ti[OCH_3]_4$ |
| | Titanium tetraethoxide | $Ti[OC_2H_5]_4$ |
| | Titanium n-propoxide | $Ti[OC_3H_7]_4$ |
| | Titanium iso-propoxide | $Ti[OCH(CH_3)_2]_4$ |
| | Titanium n-butoxide | $Ti[OC_4H_9]_4$ |
| Aluminium | Aluminium methoxide | $Al[OCH_3]_3$ |
| | Aluminium tri-ethylate | $Al[OC_2H_5]_3$ |

TABLE 1-continued

| Metal (M) | Alkoxide name | Formula $M[OR]_n$ |
|---|---|---|
| | Aluminium n-propoxide | $Al[OC_3H_7]_3$ |
| | Aluminium iso-propoxide | $Al[OCH(CH_3)_2]_3$ |
| | Aluminium n-butoxide | $Al[OC_4H_9]_3$ |
| | Aluminium tri-sec-butylate | $Al[OCHCH_2CH_3CH_3]_3$ |
| Silicon | Silicon methoxide | $Si[OCH_3]_4$ |
| | Silicon orthosilicate | $Si[OC_2H_5]_4$ |
| Zirconium | Zirconium methoxide | $Zr[OCH_3]_4$ |
| | Zirconium ethoxide | $Zr[OC_2H_5]_4$ |
| | Zirconium n-propoxide | $Zr[C_3H_7]_4$ |
| Vanadium | Vanadium ethoxide | $V[OC_2H_5]_4$ |
| | Vanadyl Oxy-ethoxide | $VO[OC_2H_5]_4$ |
| | Vanadyl Oxy-iso-propoxide | $VO[OCH(CH_3)_2]_4$ |
| Niobium | Niobium ethoxide | $Nb[OC_2H_5]_5$ |
| Tantalum | Tantalum ethoxide | $Ta[OC_2H_5]_5$ |
| Chromium | Chromium ethoxide | $Cr[OC_2H_5]_3$ |
| Tungsten | Tungsten ethoxide | $W[OC_2H_5]_5$ |
| Hafnium | Hafnium ethoxide | $Hf[OC_2H_5]_4$ |

After drying/preliminary heat treatment, the coated particles may be examined using a scanning electron microscope and /or transmission electron microscope.

3. Temperature Programmed Heat Treatment (TPRe)

The coated particles now undergo temperature programmed heat treatment. This is done in chosen gaseous environments, at chosen heating rates, to chosen top temperatures, for chosen times in order to control removal of residual volatile impurities, to densify and sinter, to change to other structural phases and to chemically react the coat with the gases leading to other material types and phases. A preferred approach is to use a flowing gas system with a carefully chosen and controlled flow rate. The heating of the coated particulate material may be done in a tube furnace, rotating tube furnace, organized to slowly "stir" the particles and so prevent fritting or agglomeration, or any appropriate furnace arrangement for the controlled heating of particulate materials in chosen controlled gaseous environments.

With reference to the schematic diagram, FIG. 1, after the preliminary drying/heat treatment, 2(b), there are several routes to convert the coat material to desired materials. (The preliminary drying/heat treatment 2(b) may itself involve a multi-step process, for example, drying in vacuum at less than 100° C. to remove mostly free water from the micropores of the coating, followed by heating, for example up to about 300° C. in vacuum or air to remove residual alcohols and chemically adsorbed hydroxyl functional groups from the surfaces).

One route, Route A, is the calcining of the coated particles in air or oxygen to convert the coat into a chosen still semi-dense oxide. Depending upon the particular porous oxide precursor material being dealt with, partial sintering and or crystallization will occur involving a partial densification. Phase changes to different crystal structured oxide may also occur and can be organized to form desired oxides. Usually nano-grain sized oxide(s) are formed by this method. In each case, the required heat treatment conditions are determined by using reaction monitoring and characterization techniques such as Thermogravimetric Analysis (TGA), Differential Thermal Analysis (DTA), X-ray Diffraction (XRD) and the like. The heating can be carried out in any convenient equipment capable of accommodating fine particulate material, although rotating furnaces and fluidized bed furnaces are preferred.

Route B provides for the heating of the dried coated particles from 2(b) in ammonia or ammonia inert gas mixtures to convert the porous oxide precursor coat to a nitride(s) or oxynitride(s). The ammonia decomposes into very active nitrogen and hydrogen species which progressively reduce and nitride the precursor oxide coat. By choice of conditions various oxynitride and nitride structures can be formed. Again the required heat treatment conditions are determined by using reaction monitoring and characterization techniques such as Thermogravimetric Analysis (TGA), Differential Thermal Analysis (DTA), X-ray Diffraction (XRD) and the like. Usually nano-grain sized coatings result.

Route C provides for the heating of the dried coated particles from 2(b) in carbonaceous hydrogen gas mixtures to convert the porous oxide precursor coat to a carbide(s) or oxycarbide(s). The carbonaceous gases may in principle be any hydrocarbon gas but preferably methane or ethane. The carbonaceous/hydrogen gas mixtures may be diluted in inert carrier gases such as argon, for example. If the active gases make up no more than 20% of the inert carrier gas then it is unlikely that an explosive gas mixture with air can form if a leak occurs and so safety is enhanced. Typical methane or ethane/ hydrogen ratios are from 1/5 to 1/20. The required heat treatment conditions are determined by using reaction monitoring and characterization techniques such as Thermogravimetric Analysis (TGA), Differential Thermal Analysis (DTA), X-ray Diffraction (XRD) and the like.

An alternative to convert the coatings to oxynitrides and nitrides is to employ Route A to a chosen oxide and then to pursue Route D by applying ammonia environment heat treatments to obtain the nitrides. Further by then employing Route E by applying carbonaceous/hydrogen gas treatments to the so formed nitride coats other carbide microstructures can be generated as compared to Route C.

Further still after Route A to the oxide structures, Route F can be employed to generate carbide microstructures directly from the oxides phases.

The alternative Route combinations allow design and variation of the carbon, nitrogen and oxygen composition of each carbide, nitride and oxide. For example by choice of route and TPRe conditions oxynitride materials, $MNO_x$ materials, M being a metallic element, with chosen x between 0.5 and 0.05 can be made. A further example is that by choice of Route and TPRe conditions carbonitride materials, $MCN_y$ materials, where y may be between 0 and 1 can be generated.

The heating temperatures necessary to produce crystalline species of the designed compositions and structures for the coat materials are relatively low. This can result in the formation of low-temperature crystalline species not obtained by more conventional solid state reactions normally conducted at higher temperatures. Most of the temperatures required are below 1200° C., are often below 1000° C. and even as low as 550° C. in some cases.

The ultrahard particles individually coated in the designed oxide, nitride or carbide phases and microstructures can now be consolidated into fully dense or near fully dense nano-grain sized composite material pieces by hot pressing treatments, preferably high pressure/high temperature treatment.

4. Hot Pressing Consolidation and Sintering

Hot pressing gives distinct advantages in comparison to pressureless sintering in achieving full densities and minimal grain growth for the consolidation of nano-grain sized materials. Examples of hot pressing techniques that can be employed are uniaxial hot pressing in carbon dies in so designed furnaces, hot isostatic pressing (HIP), extrusion and high pressure techniques. The preferred ultrahard particles in this invention are diamond and cubic boron nitride, both of which are prone to conversion to soft graphitic or hexagonal phases when subjected to prolonged high temperatures such as 1600° C. or more at ambient pressures. In the light of this, high pressure/high temperature hot pressing is the preferred technique for the method of this invention. Typical conditions that can be employed, but not restricted to, are pressures from about 2.5 to about 8 GPa and temperatures for each pressure, governed by the thermodynamic and/or chemical stability of diamond and cBN, typically in the range about 600° C. to about 1800° C. The types of high temperature/high pressure equipment that may be employed include piston and cylinder devices, piston and anvil devices, cubic anvil presses, and toroidal and belt apparatuses and others well known in the art.

The ultrahard particles individually clad in the designed, usually semidense, oxide, nitride, or carbide coats may be subjected to granulation, spray drying, freeze drying, fluidized bed granulation, all with or without temporary organic binding materials. Conventional cold pressing may also be employed to produce porous, semi-dense, "green" articles of any convenient shape using the free powder or granulated material. Pressure/temperature/time profiles are chosen in each case to densify and sinter the coating material, minimize or control grain growth and produce the composite material pieces.

The very homogeneous fine and nano-grain sized abrasive composite materials so generated exhibited improvements in properties as a result of their homogeneity and ultra fine microstructures as compared to similar composite materials made via more conventional approaches such as milling and mixing of separate powder starting materials. Improvements in toughness were observed but most remarkably significant improvements in high temperature strength and hardness were found. Composite materials with novel combinations of materials, compositions and microstructures may also be made using the method of this invention.

The abrasive fine grained composite materials so obtained in both monolithic or bonded to a hard metal substrate form, can be used in applications such as cutting, milling, grinding, drilling hard to machine materials including rock drilling and other abrasive operations.

The method of the present invention is distinguished over the prior art, in that it employs wet colloidal suspension techniques and is thus well capable of efficiently coating particulate ultrahard particles from greater than 100 microns down to sub-micron sizes and including nano-sized particulate material. This in turn allows the production of distinguishable and novel material structures and compositions over and above those indicated in the prior art. There are other aspects of the present invention which also distinguishes it from the prior art including specific means of surface chemistry manipulation of the ultrahard particulate components, colloidially coating with micro-porous oxide base precursor coatings, thermal treatment of said coating material to form chosen structures and phases, followed by specific consolidation and sintering procedures to generate improved and novel composite structures, compositions and materials.

The invention will now be described in more detail with reference to the following non-limiting examples.

Example 1

50 g of sub-micron cubic boron nitride, of average particle size 0.7 micron, in the general size range of from 0.5 to 1.0 micron was treated in fuming concentrated sulphuric acid to which was added potassium nitrate. After washing and drying the sub-micron cBN was further heated in air at 600° C. for 30 minutes. These procedures ensured that the cBN surface chemistry was dominated by oxygen related functional groups and was thus rendered vitreophilic. 15 g of this sub-micron surface treated cBN was then suspended in 865 ml of pure ethanol in a beaker to which had been added 7.3 ml of de-ionized water. The suspension was vigorously stirred with a paddle stirrer at about 100 rpm. 15.3 g of titanium iso-propoxide liquid, $Ti(OC_3H_7)_4$, was dissolved in 100 ml of anhydrous ethanol. This solution was then slowly added to the cBN/ethanol/water suspension in a drop-wise manner over a period of 1 hr, at room temperature (about 25° C.), while continuing to stir. Stirring was continued for a further 2 hrs and the beaker contents left to age overnight. The resulting coated particles were removed from the suspension by vacuum filtering, washed three times in ethanol and three times in de-ionized water and then dried at 60° C. for 2days in a vacuum oven. On examination under a scanning electron microscope (SEM), it was observed that each cBN particle had been completely coated in a titanium oxide compound, expected to be micro-porous, amorphous titania, $TiO_2$.

Figure 2:
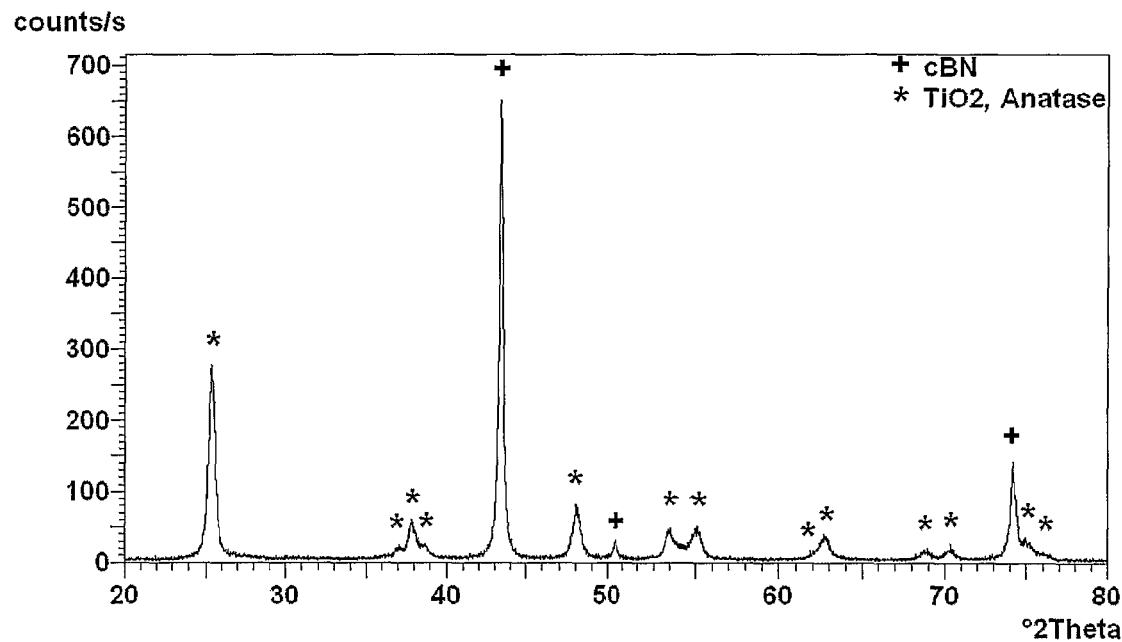
FIG. 2 is an X-ray diffractogram of titania coated cBN particles, an intermediate material in a preferred embodiment of the process of the invention.

10 g of $TiO_2$ coated cBN particles was then heat treated in flowing air at 700° C. for 3 hrs. The heating rate and cooling rates were kept at 5° C. per minute. On examination with an X-ray diffraction spectrometer it was found that the coating had been crystallized to a predominantly anatase phase of titania, as shown in FIG. 2, which is an X-ray diffractogram showing that the material is composed of titania and cBN only. On examination of a sample of this particulate material in a transmission electron microscope, TEM, it was found that the titania coat had crystallized in the form of nano-sized crystallites of about 30 nm in dimensions.

Figure 3:
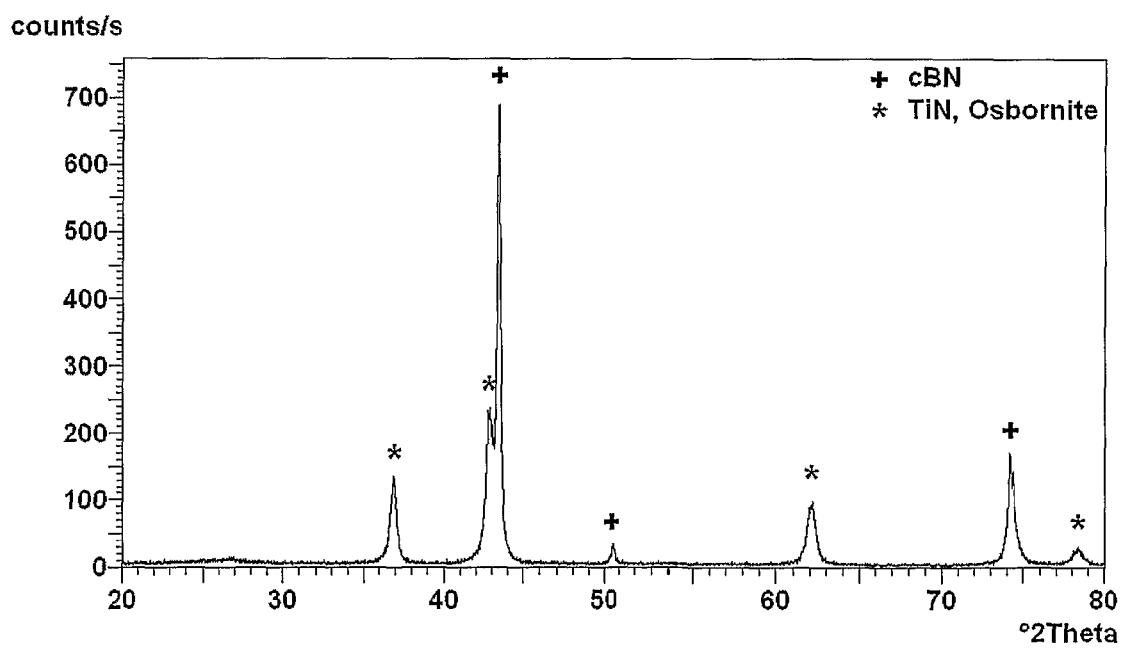
FIG. 3 is an X-ray diffractogram of titanium nitride coated cBN particles, the result of heat treating the titania coated cBN particles referred to with reference to FIG. 2.

5 g of the air heat treated titania coated sub-micron cBN particles was then further heated at 1100° C. for 5 hrs in a tube furnace while being exposed to a flow of dry ammonia gas, $NH_3$. The heating rate used was 10° C. per minute. This heat treatment in ammonia converted the nano-grain sized titania coat into nano-grain sized titanium nitride, TiN. TEM examination of this material showed that the coat was now made up of titanium nitride crystallites of about 40 nm in dimensions. FIG. 3 is a X-ray diffractogram showing that the resultant powder consists of only cBN and titanium nitride of the osbornite structure.

Figure 4:
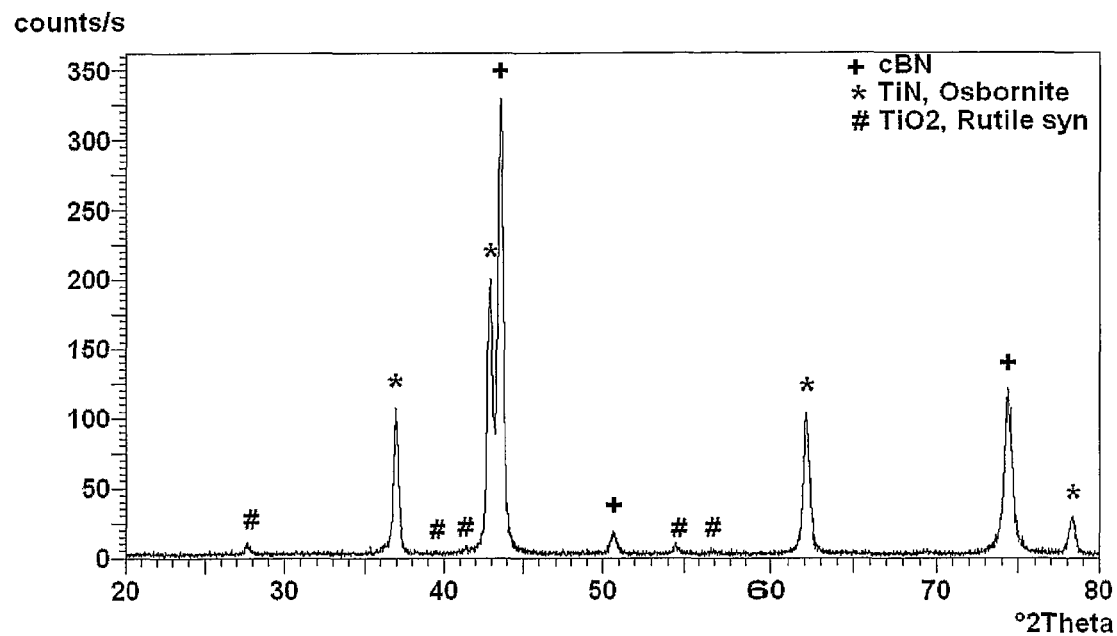
FIG. 4 is an X-ray diffractogram of sintered material produced from the titanium nitride coated cBN particles referred to with reference to FIG. 3.

2.5 g of the nano-grain sized TiN coated cBN was then subjected to a temperature of about 1300° C. at a pressure of about 5.0 GPa, for 20 min., in contact with a tungsten carbide, WC, substrate, in a belt type high pressure apparatus well known in the art. A crack free polycrystalline cBN material of about 78% by weight of cBN in a continuous TiN matrix, bonded to the WC substrate or backing was thus produced. X-ray diffraction analysis of the sintered material is shown in FIG. 4. Traces of rutile phase titania are evident. On SEM examination the resultant material was seen to be a simple dispersal of sub-micron cBN particles in a matrix of TiN. This was one aspect that distinguishes this invention from the conventional prior art where phases such as tungsten carbide, WC, together with other metallic components are expected to be found, derived from the milling/mixing bodies employed. Moreover, electron dispersion spectra, EDS, taken on the SEM, did not detect elements other than Ti, N and B. The SEM micrographs also showed that the separation of the cBN particles varied between about 50 to 100 nm. This implied that the grain size of the TiN matrix was at most equal to or smaller than these dimensions. This was confirmed when an appropriately thinned sample of the material was examined on the TEM where TiN grains of from about 20 to 100 nm were observed. The above procedure was repeated several times to generate materials for machining application tests.

The materials were electron discharge machined to produce tool samples of appropriate dimensions for wear tests involving hard to machine steels. It was found that the material produced as described above worked well as a lathe tool material while machining these steels.

Example 2

30 g of cBN powder of average particle size 2 microns was suspended in a 1 to 1 mixed solution of 15% hydrogen peroxide, $H_2O_2$, and 15% ammonium hydroxide, $NH_4OH$, in water. This served to hydrolyze the surfaces of the cBN particles and thus render them vitreophilic. The 2 micron cBN powder was then removed from suspension by filtering and washed in de-ionized water.

25.5 g of the cBN powder so prepared was then suspended in 1440 ml of ethanol to which had been added 13.1 ml of de-ionized water. The suspension was ultrasonically probed for 15 min in order to break up any agglomerates of cBN particles. 20.7 g of titanium iso-propoxide was dissolved in 100 ml of anhydrous ethanol. This solution was then added to the vigorously stirred suspension of cBN in the ethanol/water in a drop-wise fashion over a period of 1 hr at room temperature. After addition the suspension was stirred for a further 2 hrs and then left to age overnight. The particulate material was then removed from suspension by filtering and washed in pure ethanol three times followed by three washings with de-ionized water and then dried at 60° C. for two days in a vacuum oven. Examination of the particulate material in an electron microscope, using the EDS facility, showed that the cBN was coated in a compound of titanium and oxygen. Each particle was completely coated to the same degree.

20 g of this coated cBN was then calcined in a tube furnace in flowing dry air at 450° C. for 3hrs. The heating and cooling rates were kept at 5° C. per min. On examination with an X-ray diffractometer it was shown that the coating was titania, $TiO_2$, of the anatase structure.

8 g of the calcined anatase titania coated cBN was then heated in a tube furnace at 1100° C. for 5 hrs in a stream of dry ammonia gas. On examination with an X-ray spectrometer it was shown that the anatase titania coat had been converted to titanium nitride, TiN.

The so generated TiN coated 2 micron cBN particles were then subjected to a temperature of about 1300° C., at a pressure of about 5.0 GPa for 20 minutes. After cutting and polishing a section of the polycrystalline mass of material so produced, it was shown that the TiN coats had sintered to form a continuous matrix within which the 2 micron cBN particles were homogenously distributed. No other material phases other than the cBN and TiN could be detected. No metals or metal compounds (other than titanium nitride) were detected. Thus a simple composite material only made up of about 85% by weight of 2 micron average grain size cBN ultrahard particles homogenously distributed in a continuous TiN matrix had been produced.

Example 3

50 g of diamond micron derived from a synthetic diamond source by crushing size and classification procedures, of average particle size 1.0 micron, in the general size range of from 0.75 to 1.5 micron was treated in fuming concentrated sulphuric acid to which was added potassium nitrate.

This cleaning ensured that the diamond was free from metallic and inorganic surface contaminants. The diamond was then heated in a flowing 20% oxygen in argon gas stream at 480° C. for 1 hr. This procedure maximized the oxygen containing functional groups attached to the diamond surfaces and rendered the surfaces to be vitreophilic.

15 g of this 1 micron surface treated diamond was then suspended in 865 ml of pure ethanol in a beaker to which had been added 7.3 ml of de-ionized water. The suspension was vigorously stirred with a paddle stirrer at about 100 rpm. 15.6 g of titanium iso-propoxide liquid, $Ti(OC_3H_7)_4$, was dissolved in 100 ml of anhydrous ethanol. This solution was then slowly added to the diamond/ethanol/water suspension in a drop-wise manner over a period of 1 hr, at room temperature (about 25° C.), while continuing to stir. Stirring was continued for a further 2 hrs and the beaker contents left to age overnight. The resulting coated particles were removed from the suspension by vacuum filtering, washed three times in ethanol and three times in de-ionized water and then dried at 60° C. for 2 days in a vacuum oven.

12 g of the dried coated diamond was then heated in static air at 450° C. for 2 hrs. A heating rate of 5° C. per minute was used. The material was then examined using SEM and X-ray diffraction and it was found that the diamond was now coated in crystalline, anatase phase titania and that no other phases or compounds were detected. TEM examination confirmed that the coat was made up of anatase $TiO_2$ crystallites of about 10 to 20 nm in dimensions.

Figure 5:
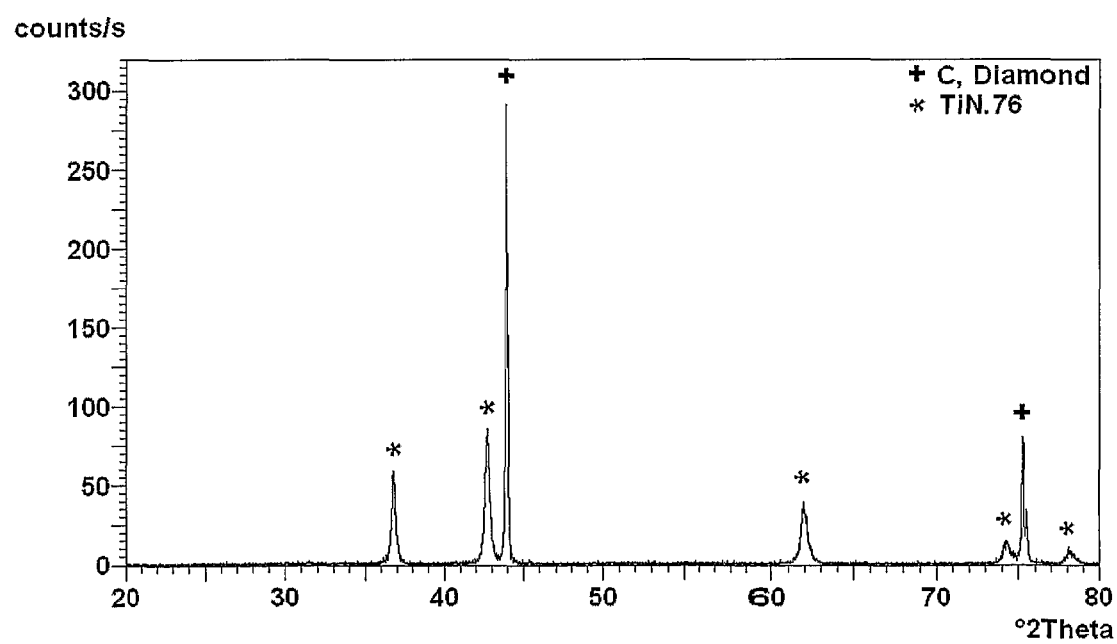
FIG. 5 is an X-ray diffractogram of titanium nitride coated diamond particles produced in accordance with another preferred embodiment of the process of the invention.

5 g of this coated material was then heat treated in flowing dry ammonia for 5 hrs at 1100° C. An ammonia flow rate of about 1 litre per minute and a heating rate of about 10° C. per minute were used. SEM and XRD analysis showed that the diamond was now coated in titanium nitride. FIG. 5 is an X-ray diffractogram showing the presence of diamond and titanium nitride and that no other phases and components were detected. TEM examination of this material showed that the coat was now made up of titanium nitride crystallites of about 20 to 250 nm in dimensions.

By subjecting this powder to a temperature of about 1350° C. and a pressure of about 5.5 GPa in a belt high-pressure apparatus, for about 20 minutes, diamond in a titanium nitride matrix composite material was produced. X-ray diffraction analysis confirmed that the composite produced was diamond in a titanium nitride matrix and that the stoichiometry of the titanium nitride was $(TiN)_{0.88}$.

Example 4

The procedure as detailed in Example 3 above may be carried out up to and until a crystalline anatase coated diamond powder has been produced. It is expected that if this powder is exposed to a flowing 10% methane in argon and 10% hydrogen in argon gas mixture, with an appropriate ratio of methane to hydrogen, at a temperature of about 1350° C. for several hours (probably more than 5 hours) that the titania coat would be converted to titanium carbide.

Subsequently it is expected that a plurality of these titanium carbide-coated diamond particles could be sintered at high pressures and temperatures to yield a composite material comprising fine diamond in a potentially nano-grained continuous titanium carbide matrix.

Example 5

1 micron diamond (0.75 to 1.5 micron size range) was acid cleaned as described in Example 3. 20 g of the acid cleaned powder was exposed to a one to one volume ratio of hydrogen peroxide (30 wt-%) and ammonium hydroxide (25%) by refluxing at 60° C. The procedure as detailed in Example 3 was carried out on the oxidized diamond particles up to and until a crystalline anatase coated diamond powder had been produced.

This titania-coated diamond powder was subjected to a temperature of 1350° C. and pressure of 5.5 GPa in a belt-type high-pressure apparatus. A diamond-titania matrix composite was so-produced.

Example 6

A crystalline titania coated cBN powder was produced as described in Example 1 up to the 700° C. heat treatment in air producing the predominantly anatase coated cBN. This powder was subjected to a temperature of 1350° C. and pressure of 5.5 GPa in a belt-type high pressure apparatus. A cBN, rutile phase titania composite was so-produced.

Example 7

1 micron synthetic diamond powder with a general particle size range of 0.75 to 1.5 micron was acid cleaned as described in Example 3. 20 g of this diamond powder was suspended in a solution comprising 258 ml of pure iso-propanol and 175 ml of de-ionized water. This suspension was heated to 60° C. in a refluxing unit and mechanically stirred with a paddle-type stirrer at about 100 rpm. 24 g of aluminium sec-butoxide, with chemical formula $AlO_3C_{12}H_{27}$, was dissolved in 100 ml anhydrous iso-propanol and added to the heated and stirred diamond suspension drop-wise over 1 hour and 45 minutes. The suspension was left stirring for 1 hour and 15 minutes at 60° C. after addition of the alkoxide. About 1 ml of hydrochloric acid (32%) was then added to the heated suspension, which was then heated up to 80° C. and stirred for an additional one hour while maintaining the temperature. The suspension was then allowed to cool to room temperature and aged at room temperature overnight. The suspension was then rotavapor dried at a temperature of 80° C. and vacuum of 400 mbar.

The aluminium-compound coated diamond was additionally dried in a vacuum oven at 60° C. for two days. SEM analysis showed that the diamond particles were coated with aluminium oxide compound.

This powder was then heat treated at 400° C. in static air for 3 hours. A heating rate of 5° C. per minute was used. X-ray diffraction analysis showed that after this heat treatment the coating on the diamond was still predominantly amorphous. This was confirmed by TEM analysis. The heat treated powder was subsequently hot pressed in contact with a tungsten carbide substrate disc at a temperature of about 1300° C. and a pressure of 5 GPa for about 20 minutes in a high pressure/high temperature belt-type apparatus, producing a diamond-aluminium oxide composite material.

The diamond particles averaging 1 micron in size were well distributed in a continuous alumina matrix. The diamond particle separation ranged from about 50 nm to 500 nm. The composite material in close proximity to the tungsten carbide substrate had been partially infiltrated with cobalt metal with some associated tungsten. The presence of these metals was detected using electron dispersive spectrometry (EDS) con the SEM. The diamond-alumina composite material was very well bonded to the tungsten carbide substrate. X-ray diffraction analysis showed that the resultant sintered material was predominantly diamond in a crystallized continuous alumina matrix.

Example 8

1 micron synthetic diamond powder (with a 0.75-1.5 micron general particle size range) was acid cleaned as described in Example 3. 30 g of this diamond powder was suspended in a mixture of 2.5 litres of pure ethanol, 500 ml of de-ionized water and 60 ml of 25 vol % aqueous ammonium hydroxide. This suspension was ultrasonicated with an ultrasonic probe for 15 minutes prior to mechanical stirring with a paddle-type stirrer at approximately 100 rpm. 80 g of tetraethyl orthosilicate of chemical formula, $Si[C_2H_5O]_4$, was dissolved in 100 ml of pure ethanol. The tetraethyl orthosilicate suspension was added to the vigorously stirred diamond suspension drop-wise over a period of 3 hours, while maintaining the mechanical stirring. After the addition of the alkoxide, the colloidal suspension was stirred for an additional 2 hours and allowed to age for 64 hours. The aged solution was then washed six times with pure ethanol and then rotavapor dried at temperatures between 70 and 80° C. and a vacuum level which was decreased to 150 mbar. The powder was additionally dried in a vacuum oven at 60° C. for 2 days.

The dried silicon-compound coated diamond was then heat treated in a tube furnace with a heating rate of 5° C. per minute up to 800° C. in a flowing argon stream. The powder was treated at 800° C. for 3 hours in the flowing argon. X-ray diffraction of the heat treated powder showed that the silicon oxide coating on the diamond was still predominantly amorphous. This was confirmed with TEM analysis.

Figure 6:
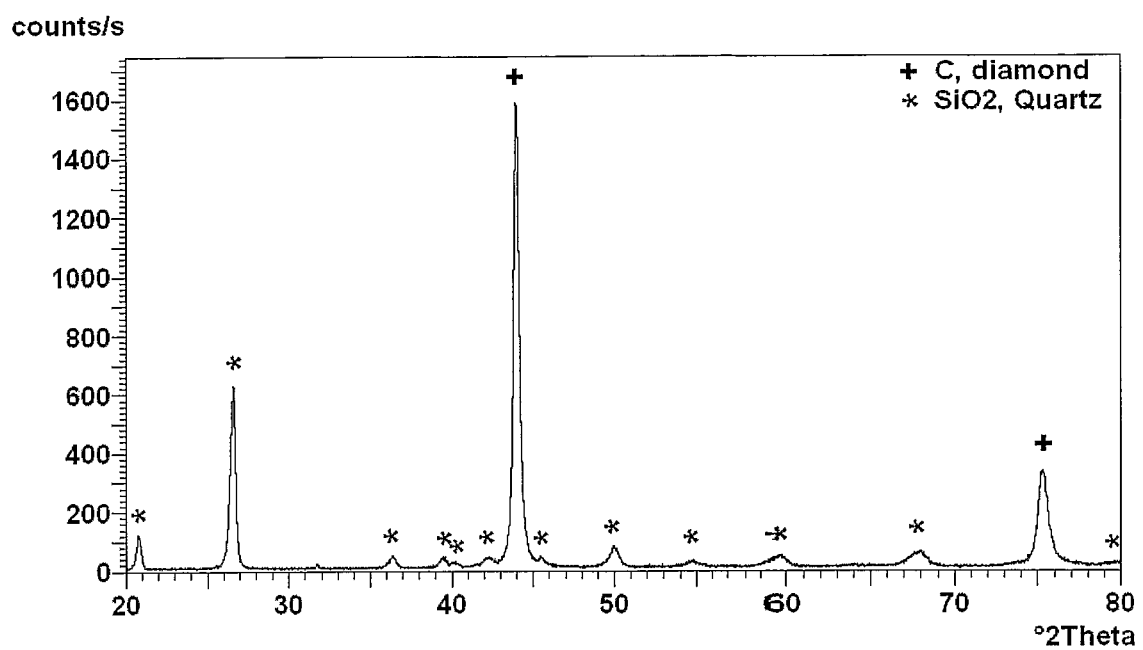
FIG. 6 is an X-ray diffractogram of a diamond-silicon oxide composite material produced in accordance with yet a further preferred embodiment of the process of the invention.

The silicon oxide-coated diamond powder was subjected to a temperature of approximately 1300° C. and a pressure of approximately 5 GPa for 20 minutes in a belt-type apparatus producing a diamond-silicon oxide composite material. Examination in the SEM of a polished sample showed that the composite material was made up of on average 1 micron diamond well-distributed in a continuous matrix. Using the EDS facility of the microscope, the matrix was shown to be a silicon oxide phase, which on examination with the X-ray diffractometer was shown to be fine-grained crystalline quartz, as demonstrated in FIG. 6, which is a X-ray diffractogram of this material.

Example 9

Sub-micron cubic boron nitride with a general particle size range of 0.5 to 1 micron (average particle size of 0.7 micron) was acid treated as described in Example 1. 34.04 g of the acid treated cBN powder was suspended in 2021 ml of pure ethanol and 42 ml of de-ionized water. This cBN suspension was treated with an ultrasonic probe for 20 minutes to eliminate agglomerates, followed by vigorous mechanical stirring with a paddle-type stirrer.

19.79 g of zirconium (IV) n-propoxide (70% w/w in n-propanol), with the chemical formula, $Zr[O(CH_2)_2CH_3]_4$, was dissolved in 122 ml of dry ethanol. The alkoxide solution was added to the stirred cBN suspension, at room temperature, drop-wise over 3 hours and left to stir for an additional 1.5 hours after addition of the alkoxide. The coated cBN suspension was left to age at room temperature overnight. The zirconium oxide coated cBN was washed three times with pure ethanol and rotavapor dried under a vacuum between 600 and 390 mbar and a temperature between 70 and 80° C. The resultant powder was additionally dried in a vacuum oven at 60° C. for 2 days. The dried powder was investigated under the scanning electron microscope and it was found that the cBN particles were well coated.

This dried powder was subsequently heat treated in static air at 600° C. for 3 hours. The heating rate that was used was 5° C. per minute. X-ray diffraction analysis of the heat treated powder showed that the cubic boron nitride and tetragonal zirconium oxide ($ZrO_2$) phases were present. TEM micrographs showed that the zirconia coat was made up of crystallites down to 5 nm in size.

The tetragonal zirconia coated cBN powder was hot pressed in contact with a tungsten carbide substrate disc at a temperature of about 1300° C. and a pressure of approximately 5 GPa for 20 minutes in a belt-type high pressure/ high temperature press. This produced a high cBN-content zirconia-matrix composite material bonded to the tungsten carbide substrate. The cBN content was estimated to be about 85% by mass.

SEM investigation of the microstructure showed that the cBN grains were well distributed in a continuous matrix where the particle separation was up to a maximum of 100 nm. X-ray diffraction analysis of the material showed that the matrix was made up of extremely fine-grained zirconia, both the tetragonal ($ZrO_{1.88}$) and monoclinic ($ZrO_2$) phases being present. The broadness of the XRD peaks due to the matrix material is consistent with the expected nano-grain structure of the zirconia matrix.

Example 10

Sub-micron cubic boron nitride with a particle size range of 0.5 to 1 micron (average particle size of 0.7 micron) was acid treated as described in Example 1. 25 g of this powder was suspended in 1.5 litres of pure ethanol and 30 ml of de-ionized water and ultrasonically probed to eliminate agglomerates for 25 minutes. In a separate beaker 0.483 g of yttrium nitrate hexahydrate, $Y(NO_3)_3.6H_2O$, was dissolved in 50 ml of pure ethanol, followed by the addition of 13.9 g of zirconium (IV) n-propoxide, chemical formula, $Zr[O(CH_2)_2CH_3]_4$ and an additional 50 ml of pure ethanol. The contents of the latter beaker were stirred with a glass rod and additionally mixed by shaking the contents in a separating funnel. The yttrium nitrate hexahydrate-zirconium (IV) n-propoxide solution mixture was added to the stirred cBN suspension in a drop-wise fashion at room temperature over a period of 2 hours. After this addition the solution was additionally mechanically stirred for 1 hour and 10 minutes. The solution was then left to age overnight at room temperature. The resulting plurality of coated particles was found to have formed a highly viscous gel after overnight ageing. After a total ageing time of 48 hours the sol-gel was rotavapor dried under a vacuum of 400 mbar and a temperature between 70 and 80° C.

This powder was additionally dried in a vacuum oven at 60° C. for 2 days. The dried zirconium oxide coated cBN powder was then heat treated in static air at 600° C. for 3 hours. A heating rate of 5° C. per minute was used. X-ray diffraction analysis showed that the resultant powder consisted of cBN and tetragonal $ZrO_{1.99}$ phases. TEM micrographs showed zirconia grains of 4 to 5 nm in size.

The heat treated powder was subjected to a temperature of about 1300° C. and a pressure of about 5 GPa for 20 minutes in a high temperature/ high pressure belt-type apparatus. This produced a cBN-zirconium oxide composite material. The cBN content was estimated to be at least 85% by mass. SEM investigation of the microstructure showed that the cBN grains were well-distributed in a continuous matrix where the particle separation was up to a maximum of 100 nm. X-ray diffraction analysis of the material showed that the matrix was made up of extremely fine-grained zirconia, both the tetragonal ($ZrO_{1.95}$) and monoclinic ($ZrO_2$) phases being present. Trace amounts of a $ZrB_2$ phase was detected. The broadness of the XRD peaks due to the matrix material is consistent with the expected nano-grain structure of the zirconia matrix.

Example 11

10 g of micron diamond derived from crushed synthetic diamond, of average size 2 microns was acid cleaned and heat treated in oxygen as described in Example 3. This rendered the surfaces of the particles vitreophilic and capable of forming bonds to oxide materials.

This material was then suspended in 150 ml of pure ethanol to which had been added 5 ml of de-ionized water in a 2 litre capacity beaker. The suspension was vigorously stirred with a paddle stirrer at about 100 rpm. 20.25 g of tungsten ethoxide of formula $W(OC_2H_5)_5$, was dissolved in 100 ml of pure anhydrous ethanol. This solution was then added slowly in a drop wise fashion to the stirred diamond in ethanol and water suspension over a period of 1.5 hrs. The suspension was stirred for a further 2 hrs after completion of the tungsten alkoxide solution addition. The reacted volume was then allowed to stand overnight for about 16 hrs. The particulate material had then settled on the bottom of the beaker and the supernatant liquid was partially milky in appearance. The supernatant liquid was decanted and the particulate material washed in pure ethanol three times by repeated stirring, settling and decanting. After the last decantation the particulate material was allowed to dry slowly at ambient conditions for 2 days. The material was then further dried in a vacuum oven at 60° C. for 24 hrs. On examination with an SEM and using the EDS facility of said instrument, the 2 micron diamond particles were seen to be coated in a tungsten oxide compound with a tungsten to oxygen ratio corresponding to tungstic oxide of formula $WO_3$.

The coated material was then heated in air at 380° C. for 3 hrs to further dry and remove in particular hydroxyl species.

5 g of the resulting coated particulate material was then heated in a tube furnace, in a stream of methane ($CH_4$), hydrogen ($H_2$), argon gas mixture. 90% of the gas volume was argon and the other 10% was a methane, hydrogen mixture. The ratio of methane to hydrogen volume was 1 to 4. The overall gas flow rate employed was about 50 ml/min. The furnace temperature was increased at a rate of 10° C. per minute and a top constant temperature was then maintained for 10 hrs. After cooling and subsequent SEM and XRD analysis it was found that the particulate diamond was now coated in extremely fine grained tungsten carbide, WC.

The WC coated diamond was then sintered in a belt high pressure apparatus at a temperature of about 1400° C. and a pressure of about 5.5 GPa. A composite material composed of about 50% by weight 2 micron diamond distributed in an extremely fine grained sintered tungsten carbide matrix was obtained. It is expected that the grain size of the tungsten carbide matrix would be substantially nano-sized, that is, where the grains would be significantly smaller than 100 nm in general dimensions.

5 g of the remaining tungsten oxide coated diamond was also heated in pure hydrogen at 550° C. for 3 hrs. The oxide coat was thus reduced to form micro-crystalline tungsten metal.

The tungsten metal coated diamond particles may then be subjected to a temperature of about 1400° C. and a pressure of about 5.5 GPa. A composite material made up of approximately 50% by weight 2 micron diamond distributed in a micro-crystalline tungsten metal matrix is expected to be produced.

Example 12

A batch of 2 micron diamond was cleaned and the particle surfaces prepared by the same method as described in Example 1. 2 micron cBN was also acid cleaned and surface prepared in the same manner as described in Example 3. These diamond and cBN powders can be mixed in an alcoholic suspension and coated in the same manner as described in Examples 2 and 3 in a 1:1 mass ratio. It is expected that this would result in an amorphous titanium oxide coated diamond/cBN powder, whereby each particle is individually coated in the titania. This powder then being heat treated in air, followed by heat treatment in dry ammonia at 1100° C. (as detailed in Example 3) would result in a crystalline titanium nitride coated diamond/cBN powder. Subjecting this powder to the high pressure/ high temperature sintering conditions as described in Example 2, would result in a homogeneous distribution of diamond and cBN particles all in turn evenly distributed in a continuous micro-/nano-crystalline titanium nitride matrix.

Example 13

Batches of 1 micron synthetic diamond were acid cleaned and surface treated in the same manner as described in Example 3.

A zirconium and yttrium alkoxide such as zirconium (IV) n-propoxide and yttrium (III) iso-propoxide could be mixed in an anhydrous alcohol, such that the resultant $ZrO_2$ would contain between 3 and 8 mol %. This alkoxide mixture could be added drop wise to an alcoholic suspension of the diamond as described in Example 10. The coated diamond powder could be dried and heat treated as described in Example 10 to produce a predominantly nano-sized tetragonal phase zirconia coating on the diamond particles. It is expected that subjecting this powder to high pressure/ high temperature sintering as detailed in Example 2 would result in a diamond-zirconia composite material.

The invention claimed is:
1. A method of manufacturing a polycrystalline abrasive element including the steps of
   providing a plurality of ultrahard micron, sub-micron or nano size abrasive particles having vitreophilic surfaces that form chemical bonds with oxides,
   coating the ultrahard abrasive particles with an amorphous or nano-crystalline oxide, hydroxide or oxohydroxide matrix precursor material using a wet colloidal suspension reaction method,
   heating the coated ultrahard abrasive particles to dry the coating, and
   heating the coated ultrahard abrasive particles in a gaseous environment to convert the matrix precursor coating material to an oxide, nitride, carbide, oxynitride, oxycarbide and/or carbonitride of the matrix precursor material, or an element form of the matrix precursor material, or combinations thereof; and
   consolidating and sintering the coated ultrahard abrasive particles at a pressure and temperature at which they are crystallographically or thermodynamically stable to generate a polycrystalline abrasive element comprising ultrahard abrasive particles or grains of sub-micron or nano size in the matrix material.

2. A method according to claim 1, wherein the ultrahard abrasive particles are selected from the group comprising diamond, cubic boron nitride, silicon carbide, silicon nitride, boron carbide and boron suboxide ($B_6O$).

3. A method according to claim 1, wherein the ultrahard abrasive particles are diamond or cubic boron nitride or a combination of these materials, and wherein the particles are treated in a surface treatment process in order to render the surfaces thereof vitreophilic.

4. A method according to claim 1, wherein the converted matrix precursor material is selected from micron, sub micron or nano-grain sized oxides, nitrides, carbides, oxynitrides, oxycarbides and carbonitrides of the matrix precursor materials, or elemental matrix precursor materials, or combinations thereof.

5. A method according to claim 1, wherein the converted matrix precursor material is selected from the oxides, nitrides, carbides, oxynitrides, oxycarbides and carbonitrides of aluminium, titanium, silicon, vanadium, zirconium, niobium, hafnium, tantalum, chromium, molybdenum and tungsten and any appropriate combination of these materials.

6. A method according to claim 1, wherein the matrix precursor material is an amorphous or nano-grain sized compound of aluminium, titanium, silicon, vanadium, zirconium, niobium, hafnium, tantalum, chromium, molybdenum and tungsten and any appropriate combination of these materials.

7. A method according to claim 1, wherein the converted matrix precursor material is an elemental form of tungsten, molybdenum or a combination or alloy of these metals.

8. A method according to claim 1, wherein the elemental form of the converted matrix precursor material is nano-grain sized tungsten, molybdenum or a combination or alloy of these metals.

9. A method according to claim 1, wherein the ultrahard abrasive particles are suspended in a liquid medium, and a suitable chemical reagent is introduced to form an amorphous or nano-crystalline oxide, hydroxide or oxo-hydroxide entities that bond to the surfaces of the respective particles and build up into coatings on the particles.

10. A method according to claim 9, wherein the suitable chemical reagent is at least one alkoxide or solution of the alkoxide(s) in an alcohol.

11. A method according to claim 9, wherein the liquid medium is an aliquot of water and alcohol.

12. A method according to claim 10, wherein the alkoxide is an alkoxide of an element chosen from aluminium, titanium, silicon, zirconium, vanadium, niobium, tantalum, chromium, molybdenum, tungsten, hafnium and yttrium.

13. A method according to claim 10, wherein two or more alkoxides are introduced into the liquid medium, which are selected from alkoxides of the elements aluminium, titanium, silicon, zirconium, vanadium, niobium, tantalum, chromium, molybdenum, tungsten, hafnium and yttrium.

14. A method according to claim 10, wherein the suitable chemical reagent is a mixed alkoxide compound or complex incorporating two or more of the elements aluminium, titanium, silicon, zirconium, vanadium, niobium, tantalum, chromium, molybdenum, tungsten, hafnium and yttrium.

15. A method according to claim 10, wherein the alcohol has the same alkyl group as the alkoxide(s).

16. A method according to claim 1, wherein the matrix precursor material coats are substantially micro-porous.

17. A method according to claim 16, wherein the coated ultrahard abrasive particles are subjected to temperature controlled heating in air, vacuum or inert gas to remove volatiles and unwanted chemical species attached to the high surface area of the micro-porous, amorphous coats.

18. A method according to claim 17, wherein the coated ultrahard abrasive particles are subjected to further heat treatment or calcination to crystallize the coats to form fine grained or nano-size grained oxide ceramics.

19. A method according to claim 17, wherein the coated ultrahard abrasive particles are subjected to further heat treatment to vitrify the coats to form glasses.

20. A method according to claim 16, wherein the coated ultrahard abrasive particles are subjected to temperature controlled reactions in reactive gases to convert the coat materials into non-oxide ceramics or glasses.

21. A method according to claim 20, wherein nitrides are formed by reacting the coats with ammonia gas.

22. A method according to claim 20, wherein carbides are formed by reacting the coats in mixtures of carbonaceous gases and hydrogen.

23. A method according to claim 22, wherein the carbides are formed by reacting the coats in a mixture of methane or ethane and hydrogen.

24. A method according to claim 16, wherein the coated ultrahard abrasive particles are subjected to temperature controlled reactions in reactive gases to convert the coat materials into oxynitride or oxycarbide ceramics or glasses.

25. A method according to claim 18, wherein the oxide coats are reducible by hydrogen and are converted into micro or nano-grain sized elements or metals.

26. A method according to claim 1, wherein the coated ultrahard abrasive particles are consolidated, compacted and the coats sintered by hot pressing.

27. A method according to claim 1, wherein the coated ultrahard abrasive particles are consolidated, compacted and sintered under conditions of high pressure and temperature.

28. A polycrystalline ultrahard abrasive element comprising diamond of sub-micron or nano size in a matrix selected from titania, $TiO_2$, hafnia, $HfO_2$, silica, $SiO_2$, zirconia, $ZrO_2$, titanium nitride, TiN, vanadium nitride, VN, hafnium nitride, HfN, niobium nitrides, NbN, $Nb_2N$, tantalum nitride, TaN, molybdenum nitride, $Mo_2N$, tungsten nitride, $W_2N$, titanium carbide, TiC, vanadium carbide, VC, hafnium carbide, HfC, niobium carbide, NbC, tantalum carbide, TaC, molybdenum carbide, $Mo_2C$, tungsten carbides, $W_2C$, WC, molybdenum, Mo and Tungsten, W.

29. A polycrystalline ultrahard abrasive element comprising cubic boron nitride of sub-micron or nano size in a matrix selected from alumina, $Al_2O_3$, titania, $TiO_2$, hafnia, $HfO_2$, silica, $SiO_2$, zirconia, $ZrO_2$, vanadium nitride, VN, hafnium nitride, HfN, niobium nitrides, NbN, $Nb_2N$, tantalum nitride, TaN, molybdenum nitride, $Mo_2N$, tungsten nitride, $W_2N$, vanadium carbide, VC, hafnium carbide HfC, niobium carbide, NbC, tantalum carbide, TaC, molybdenum carbide, $Mo_2C$, tungsten carbides, $W_2C$, WC, molybdenum, Mo and Tungsten, W.

30. A polycrystalline ultrahard abrasive element comprising a combination of diamond and cubic boron nitride of sub-micron or nano size in a matrix selected from alumina, $Al_2O_3$, titania, $TiO_2$, hafnia, $HfO_2$, silica, $SiO_2$, zirconia, $ZrO_2$, titanium nitride, TiN, vanadium nitride, VN, hafnium nitride, HfN, niobium nitrides, NbN, $Nb_2N$, tantalum nitride, TaN, molybdenum nitride, $Mo_2N$, tungsten nitride, $W_2N$, titanium carbide, TiC, vanadium carbide, VC, hafnium carbide HfC, niobium carbide, NbC, tantalum carbide, TaC, molybdenum carbide, $Mo_2C$, tungsten carbides, $W_2C$, WC, molybdenum, Mo and Tungsten, W.

31. A polycrystalline ultrahard abrasive element comprising diamond of sub-micron or nano size in an alumina matrix, cubic boron nitride of sub-micron or nano size in a titanium nitride matrix or cubic boron nitride of sub-micron or nano size in a titanium carbide matrix, provided that the grain size of the matrix material is nano-sized.

32. A polycrystalline ultrahard abrasive element according to claim 28, wherein the matrix material is non-stoichiometric.

33. A polycrystalline ultrahard abrasive element according to claim 29, wherein the matrix material is non-stoichiometric.

34. A polycrystalline ultrahard abrasive element according to claim 30, wherein the matrix material is non-stoichiometric.

35. A polycrystalline ultrahard abrasive element according to claim 31, wherein the matrix material is non-stoichiometric.

36. The method according to claim 1, wherein the step of heating the coated ultrahard abrasive particles is a gaseous environment comprises heating the particles in a gaseous environment incorporating reaction gases to convert the coating.

37. The method according to claim 1, wherein the step of consolidating and sintering the coated ultrahard abrasive particles at a pressure and temperature at which the particles are crystallographically or thermodynamically stable comprises generating a polycrystalline abrasive element comprising ultrahard abrasive particles or grains of sub-micron or nano-size in the matrix material, the sintered matrix material being nano-grain sized.

* * * * *